United States Patent [19]
Martin, Jr.

[11] Patent Number: 4,505,971
[45] Date of Patent: Mar. 19, 1985

[54] FLUOROPLASTIC AND METAL LAMINATE HAVING RUBBER COMPOUND BONDED LAYERS

[75] Inventor: Theodore O. Martin, Jr., Wadsworth, Ohio

[73] Assignees: Ted Martin, Jr.; Chloeta Fay Martin, both of Wadsworth, Ohio

[21] Appl. No.: 507,048

[22] Filed: Jun. 23, 1983

[51] Int. Cl.³ .................. B32B 25/04; B32B 25/14
[52] U.S. Cl. .................. 428/216; 428/328; 428/331; 428/408; 428/421; 428/422; 428/462; 428/497; 428/519; 428/702; 428/521; 156/333; 105/423
[58] Field of Search .......... 428/216, 328, 331, 408, 428/421, 422, 462, 497, 519, 521

[56] References Cited
U.S. PATENT DOCUMENTS

| | | | |
|---|---|---|---|
| 3,781,185 | 12/1973 | Takamatsu et al. | 428/462 |
| 4,024,316 | 5/1977 | Loris | 428/462 |
| 4,075,288 | 2/1978 | Graveron et al. | 428/962 |
| 4,252,859 | 2/1981 | Concannon et al. | 428/422 |
| 4,339,506 | 7/1982 | Martin, Jr. | 428/519 |

Primary Examiner—Patricia C. Ives
Attorney, Agent, or Firm—Maky, Renner, Otto & Boisselle

[57] ABSTRACT

A process and composition for adhering a rubber compound to a fluoroplastic and/or to metal. The invention contemplates the use of separate, sequentially applied adhesive layers to the fluoroplastic or metal substrate. The last applied layer, a rubber cement, allows the metal or fluoroplastic to be adhered to the uncured rubber compound which is subsequently vulcanized. The invention finds particular utility in securing a fluoroplastic and a rubber lining to steel or other metallic surfaces. A typical use is the lining of the interior of a railroad tank car, providing protection from corrosive or hostile environments experienced when the tank car is transporting acids or other caustic materials. Other uses include the lining of chemical process vessels and piping.

6 Claims, 1 Drawing Figure

FLUOROPLASTIC AND METAL LAMINATE HAVING RUBBER COMPOUND BONDED LAYERS

TECHNICAL FIELD

The invention herein lies in the art of adhesion and more particularly in the field of adhesive systems for bonding rubber to a metal or plastic.

BACKGROUND ART

For various reasons it has heretofore been difficult to bond rubber to plastic and particularly to fluoroplastic. Prior art bonding systems often require special surface treatments and involve the use of expensive compounds such as epoxies, and any bonding which does occur is generally weak or decreases rapidly upon ageing. Adhesive bonds to fluoroplastics are also severely tested due to the often hostile and/or corrosive environments in which fluoroplastics are commonly used. U.S. Pat. No. 4,115,614 deals with the bonding of chlorinated polyethylenes to rubber. There is no mention of bonding fluoroplastic to rubber.

Regarding rubber to metal adhesion, there is a great deal of art in the field of tire manufacture, where such bonds are used to adhere metal belts to the rubber carcass. For the most part, adhesion promoters are used which are compounded into the rubber recipe. They are usually proprietary and expensive and further can be used only in conjunction with brass or brass coated steel.

By contrast, the instant invention provides for a relatively inexpensive, simple adhesion system which, when used to bond a fluoroplastic to rubber can withstand severe environmental conditions. The very same system can also be used to bond rubber to a metal, yet does not require special compounding or a brass coating over the metal.

DISCLOSURE OF THE INVENTION

It is therefore an aspect of the invention to provide both an adhesive process and composition which will bond a fluoroplastic to rubber.

It is another apsect of the invention to provide a process and composition, as above, which will bond a metal to rubber.

It is yet another aspect of the invention to provide a process and composition, as above, which is inexpensive.

It is yet another aspect of the invention to provide a process and composition, as above, which does not require the metal to be brass or have a brass coating.

It is still another aspect of the invention to provide a process and composition, as above, which can withstand severe environmental conditions.

It is yet another aspect of the invention to provide a process and composition, as above, which comprises an adhesive laminate.

These aspects and others which will be understood more clearly with a detailed reading of the description which follows, are achieved by: a laminate, comprising: a substrate; a metal primer layer positioned over said substrate; a ty ply layer positioned over said metal primer layer; a ty coat layer positioned over said ty ply layer; a rubber cement layer positioned over said ty coat layer; and a rubber compound layer positioned over said rubber cement layer; wherein said substrate is selected from the goup consisting of a fluoroplastic or a metal.

BRIEF DESCRIPTION OF THE DRAWING

In order to understand more fully the teachings and scope of the invention, a reading of the description should be accompanied by reference to the drawing, designated FIG. 1, in which a cross sectional view of the adhesive laminate of the invention is displayed.

BEST MODE FOR CARRYING OUT THE INVENTION

Figure 1:
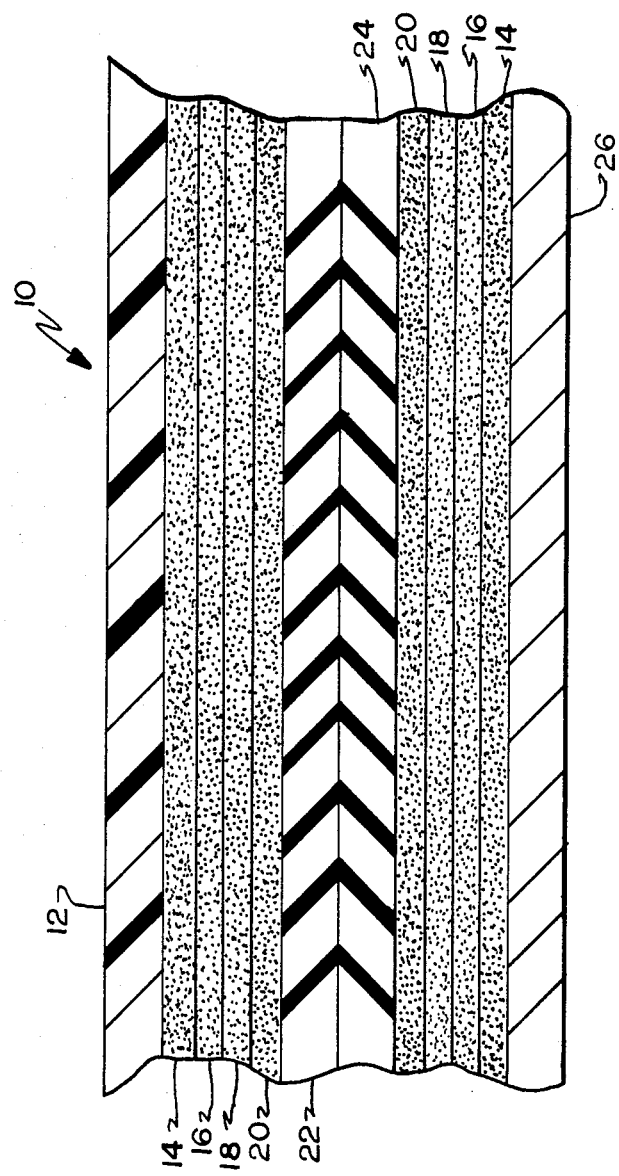

The various adhesive layers of the invention can be seen with reference to the FIGURE, wherein the laminate is generally indicated by the number 10. A layer of fluoroplastic 12 is followed successively by a metal primer layer 14, a ty ply layer 16, a ty coat layer 18, a rubber cement layer 20 and two elastomer layers 22 and 24. The four layers are then repeated in reverse order, followed by a metal substrate 26.

The utility of the invention lies in the synergism exhibited when the layers 14–20 are combined as hereinafter set forth. It has been discovered that through the use of sequential adhesive layers, each layer capable of being bonded to the succeeding layer, an adhesive system is produced in which the adhesive composition in contact with the fluoroplastic, rubber or metal substrate bonds to that substrate, yet need not be capable of bonding to the other two substrates. Thus, while layer 14 bonds to the fluoroplastic layer 12 or the metal layer 26, it in itself would provide poor adhesion to either of the elastomer layers 22 or 24. Similarly, rubber cement layer 20 would not give proper adhesion by itself to the fluoroplastic or metal layer. The ty ply layers and ty coat layers 16 and 18 respectively provide the transition which enables the adhesive system to bond together the three types of substrates. Naturally, while the drawing shows 2 sequences of adhesive layers 14 through 20, the scope of the invention includes the use of only one sequence. That is, a fluoroplastic bonded to a rubber layer using adhesive layers 14 through 20 may be bonded to a second rubber layer which is itself bonded to another substrate using a different adhesive system.

Regarding specifically the fluoroplastic layer 12, it can be composed of any one of a number of materials well known to those skilled in the art. Examples of the most widely used of these plastics are polytetrafluoroethylene, otherwise known as PTFE, sold under the trademark TEFLON by DuPont, fluorinated ethylene propylene copolymer, poly-chlorotrifluoroethylene, ethyl-chlorotrifluoroethylene copolymers and ethylene-tetrafluoroethylene copolymers. These fluoroplastics, as well as others, are generally available under various tradenames from a number of suppliers. For purposes of the invention, they are generally obtained in sheets of thicknesses which are a function of the intended use, which can vary from about 10 mils to about 50 mils. Above a thickness of 0.050 inches, the fluoroplastic sheet becomes increasingly stiffer and more difficult to handle. A preferred thickness is about 20 mils.

The metal primer layer 14 positioned immediately below the fluoroplastic layer 12 is primarily a chlorinated natural rubber. Specifically, the rubber is chlorinated cis 1,4-polyisoprene wherein from 60 to 69 weight percent of the rubber is chlorine. Chlorination in effect breaks the carbon-carbon double bonds in the polymer chain, substituting chlorine on the now substantially saturated rubber chain. A suitable commercial source of this type of rubber is PARLON, manufactured by Hercules, Inc. Like most primers, PARLON contains a pigment such as lead chromate, which has no effect on the performance of the primer layer. Thus, other types of highly chlorinated rubber may be used which do not contain a pigment. The primer is applied as a solution in organic solvents. A number of well known organic solvents can be used such as the various aromatics, alcohols, and esters. Preferred are toluene and isopropyl acetate, which are each added in amounts of from about 125 to 165 phr. For reasons of viscosity and uniform distribution, preferably about 135–155 phr each of isopropyl acetate and toluene are used.

The ty ply layer 16 is also composed of chlorinated rubber, but instead of a pigment, an organic filler is utilized comprising one or more commonly used rubber compounding ingredients such as carbon black or silica, including hydrated amorphous silica. The chlorinated rubber is cis 1,4 polyisoprene having from about 50 to about 69 wt.% chlorine. This results in a substantially saturated polymer similar to that in the metal primer layer 14. The filler, on a 100 parts per hundred parts rubber basis, is present in amounts from about 3 to about 15 parts. The rubber and filler are put in solution, utilizing from about 350 to 450 phr of an organic solvent, preferably xylene. A suitable formulation is available commerically under the trademark Ty-Ply Q, manufactured by the Hughson Chemical Company.

The ty coat layer 18 is a mixture of cis 1,4 polyisoprene and a chlorinated rubber having from about 12 to about 19 wt.% chlorine. On a 100 phr polyisoprene basis, about 40 to 60 and preferably about 50 phr of chlorinated rubber is used. Because of the relatively small amount of chlorine substitution, the chlorinated rubber, often referred to as Hypo rubber, contains a significant amount of unsaturation which allows crosslinking to take place upon curing. As this layer is indeed crosslinked as described hereinafter, various other well known compounding ingredients are added to the polyisoprene and the Hypo rubber, such as antioxidants, zinc oxide, stearic acid, rosin oil, accelerators and of course a curing agent, commonly sulfur. All these ingredients are dissolved in an organic solvent which is preferably a mixture of toluene and xylene.

Useful antioxidants are available from a number of sources and comprise the various phenylenediamines and related compounds. Generally from about 2.5 to about 7.5 phr of antioxidant is used with about 5.23 phr being preferred. Zinc oxide may be used in amounts from about 0.5 to about 1.5 phr, with about 1.05 phr being preferred. Between about 0.2 and 0.8 phr of stearic acid is used, with about 0.5 phr preferred. The amount of rosin oil can vary from about 1 to about 2 phr with about 1.5 phr preferred.

The accelerator may be any one of a number of well known accelerators, but is preferably a thiuram type, with tetramethylthiuram disulfide highly preferred. From about 0.1 to 0.5 phr is used, with about 0.3 phr preferred. The amount of sulfur may vary from about 1.0 to about 3.0 phr, with about 2.1 phr preferred. The amount of solvent varies with the particular type used, but in general is from about 450 phr to about 1650 phr. When the solvent mixture is toluene and xylene, the preferred amounts are about 333 phr and 779 phr, respectively.

The adhesive layers applied immediately adjacent to the rubber substrate layers 22 and 24 are rubber cement layers 20. Like the ty coat layers 18, the rubber cement layer 20 are crosslinkable, comprising an unsaturated rubber compound in an organic solvent. On a 100 parts by weight of rubber basis, the rubber compound contains from about 0.5 to about 1.5 phr of antioxidant, from about 0.5 to 1.5 phr zinc oxide, from about 0.2 to about 0.8 phr stearic acid, from about 1.0 to about 2.0 phr rosin acid, from about 0.1 to about 0.5 phr of an accelerator and from about 1.0 to about 3.0 phr sulfur. The solvent or solvent mixture can comprise any of those mentioned above, but is preferably toluene in an amount from about 200 to about 400 phr. Again, the type of solvent will determine the amount utilized.

While the preferred rubber for the cement layer 20 is natural or synthetic cis 1,4-polyisoprene, other elastomers and/or monomers may be used. In general, any crosslinkable compound is satisfactory including dienes having from 4 to 12 carbon atoms and vinyl substituted aromatics having from 8 to 20 carbon atoms. The rubber may thus comprise any of those utilized in the art of rubber compounding which produce a crosslinked product. The preferred amounts of non-rubber compounding ingredients include about 1.05 phr antioxidant, about 1.05 phr zinc oxide, about 0.5 phr stearic acid, about 1.5 rosin acid, about 0.3 phr accelerator and about 2.1 phr sulfur. Preferably the amount of toluene is from about 330 to about 335 phr.

With regard to the rubber substrate layers 22 and 24, they can be any well known type of elastomer. In general, these include the various homopolymers and copolymers of diene monomers having from 4 to 12 carbon atoms and the various vinyl substituted aromatics having from 8 to 12 carbon atoms. Natural cis 1,4 polyisoprene is preferred. Specific examples of diene monomers include cis-1,4-polyisoprene (synthetic natural rubber), butadiene, piperylene, hexadiene, heptadiene, octadiene, decadiene, dodecadiene, 2,3-dimethyl-1,3-butadiene, 2-methyl-1,3-pentadiene, 3,4-dimethyl-1,3-hexadiene, 4,5-diethyl-1,3-octadiene, 3-butyl-1,3-octadiene, and the like. Examples of specific vinyl substituted aromatic monomers include styrene, $\alpha$-methylstyrene, ortho-, para-, and metamethyl and ethyl styrenes and the like. A specific example of such a copolymer is styrene butadiene rubber (SBR), which is preferred. The number average molecular weight may range from about 10,000 to about 500,000 with a range from about 10,000 to about 400,000 being preferred.

As is conventional in the art, the elastomer used for the rubber layers is compounded with various well known non-rubber ingredients. These include carbon black, zinc oxide, silica, various clays, oils, waxes and fibers as well as antioxidants, antiozonates, curing agents (both sulfur and peroxide), accelerators, processing agents, and the like. The actual compounding process may utilize conventional equipment such as rubber mills, internal mixes, etc. The particular rubber compounding recipe used is not critical, a host of commercially available compounds and published recipes being entirely suitable. A wealth of detailed information regarding rubber compounding can be found in *The Vanderbilt Rubber Handbook*, Winspear, ed., R. T. Vanderbilt Company, New York, N.Y. (1968), which is hereby incorporated by reference.

The compounding ingredients just described for the ty coat, rubber cement and rubber compound layers are to be considered as only suggestive of the types of recipes useful in the invention. A skilled compounder may find other combinations of accelerators, antioxidants and the like which provide satisfactory performance.

Further, recipes could possibly be constructed having ranges of ingredients outside those which are disclosed herein. These alterations however, should not be construed as providing rubber compositions lying outside the scope of the invention, as the inventive concept does not reside in the incidental ingredient mixture, but rather in the combination of layers.

The process by which the laminate is constructed is important in obtaining proper adhesion. Adhesive layers 14, 16, 18 and 20 are applied successively and independently to the fluoroplastic layer 12 and metal layer 26. That is, these two substrates are initially coated in two separate operations. After each of the two substrates have received a coating of rubber cement as detailed hereinafter, a rubber layer 20 or 22 respectively is applied. The two rubber layers 22 and 24 are then positioned adjacent each other as shown in the FIGURE and the entire laminate is cured by conventional means, most conveniently using steam as a source of heat to promote vulcanization.

With reference to the application of individual adhesive layers to the substrates, they are generally applied by painting the surface with a brush or by spraying. Because the solvent in each layer evaporates quickly and is used strictly as a carrier or vehicle, its only purpose being to obtain a sufficiently low viscosity to facilitate application and thereby deposit a layer having the desired thickness, which can vary from about 1 to about 5 mils and is preferably about 2 to about 3 mils.

The first layer to be applied to the fluoroplastic and metal substrates is the metal primer layer 14. This layer is allowed to dry for at least 30 minutes at room temperature. Layer 16, the ty ply layer, is next applied using a brush or spray painting. The drying time for this layer is critical and must be not exceed about two hours at ambient temperature. If this drying time is exceeded, there is poor or no adhesion to the next applied layer, the ty coat layer. The ty coat is applied as above and allowed to dry between 30 minutes and 2 or more hours, the exact time being unimportant. The last applied layer is the rubber cement layer which is allowed to dry to tack. The time to tack can readily be ascertained by the routineer in the art. Over the rubber cement layer is applied the rubber substrate layer 22 or 24. With regard to applying layer 22 over the fluoroplastic, a convenient method involves calendering, using conventional equipment. Depending upon the application, this can also be done with layer 24 applied to the metal substrate 26, however modification of the equipment may be necessary.

A preferred use of the invention is as a lining for a railroad tank car. In this application, the invention provides for a protective coating which prevents corrosion of the inside of the car which would normally occur when transporting acids or caustic materials. A specific utility is in the lining of a tank car which carries HCl solution. It has been found that in the vapor space above the liquid level, an unprotected rubber lining will become brittle through chlorination by HCl vapor. This leads in turn to cracking and chunk out of the lining, exposing the metal surface underneath. Corrosion of the metal occurs unchecked thereafter. When the car is lined with the laminate of the invention, however, the fluoroplastic, being impervious to HCl, provides complete protection.

In lining a railroad tank car, a calendered sheet of fluoroplastic and rubber is rolled-up and inserted through the manhole in top of the tank car. It is then unfurled and normally applied to the upper surface of the inside of the tank car in an arc which, if the tank car is cylindrical, stretches from about 10 to about 2 o'clock when the tank car is viewed along its longitudinal axis. It is this portion of the inner surface which often is subject to the highest amount of corrosion, most probably because of the oxidative effect of vapors. Naturally, the invention also contemplates the lining of other portions of the tank car as well.

The following example illustrates the process of making the laminate:

EXAMPLE

A laminate was made as follows: a polytetrafluoroethylene (PTFE) sheet of approximately 0.020 inches in thickness was coated with a layer of metal primer having the preferred composition recited above. Application was by brush, giving a coating of approximately 2 mils. The solvent was allowed to evaporate at room temperature for approximately 1 hour. A ty ply layer having the same approximate thickness was then applied by brush atop the metal primer layer. This second layer was allowed to dry at room temperature for 1 and ½ hours. A ty coat layer was then applied in similar fashion and allowed to dry for 2 hours, followed by a rubber cement layer which was dried to tack (approximately 1 hour). The sheet was then calendered with a 3/16th inch layer of natural rubber compound. A steel surface was also treated in a similar fashion, except that prior to application of the metal primer layer, the steel surface was sand blasted to remove all dirt and residue. A natural rubber compound was then applied to each surface, to the steel by hand and to the fluoroplastic surface by calendering in a machine. The rubber layers were then joined together and had sufficient tack so that they adhered to each other without the use of adhesive aids. The laminate was then placed in an autoclave and cured for one hour at 260 degrees F. using 20 psig saturated steam. Good adhesion was obtained between the layers which could not be pulled apart. In addition to the lining of tank cars, the invention can be utilized to provide an impervious, inert surface to chemical process vessels, process piping, and the like. The specific requirements of application will occur readily to those skilled in the art.

The disclosure given herein, while satisfying the requirements of the Patent Statutes in giving the best mode and the preferred embodiments, is not to be construed limiting the invention. Rather, the scope of the invention should be measured by the following attached claims.

What is claimed is:

1. A laminate, comprising:
   a substrate;
   a metal primer layer positioned over said substrate, said metal primer layer containing chlorinated cis 1,4-polyisoprene having from about 60 to about 69 wt.% chlorine;
   a ty ply layer positioned over said metal primer layer, said ty ply layer containing chlorinated cis 1,4-polyisoprene having from about 50 to about 69 wt.% chlorine;
   a ty coat layer positioned over said ty ply layer, said ty coat layer containing about 100 parts by weight of cis 1,4 polyisoprene and about 40 to 60 phr of a chlorinated cis 1,4-polyisoprene having from about 12 to about 19 wt.% chlorine;

a rubber cement layer positioned over said ty coat layer, said rubber cement layer containing an elastomer made from monomers selected from the group consisting of dienes having from 4 to 12 carbon atoms, and combinations of dienes having from 4 to 12 carbon atoms and vinyl substituted aromatic compounds having from 8 to 20 carbon atoms; and a rubber compound layer positioned over said rubber cement layer;

wherein said substrate is selected from the group consisting of a fluoroplastic or a metal.

2. A laminate according to claim 1 wherein said fluoroplastic is selected from the group consisting of polytetrafluoroethylene, fluorinated ethylene copolymer, polychlorotrifluoroethylene, ethylene-trifluoroethylene copolymer and ethylene-tetrafluoroethylene copolymer; and wherein said rubber compound layer is an elastomer made from monomers selected from the group consisting of dienes having from 4 to 12 carbon atoms, and combinations of dienes having from 4 to 12 carbon atoms and vinyl substituted aromatics having from 8 to 20 carbon atoms.

3. A laminate according to claim 2, wherein said metal primer layers, said ty ply layer, said ty coat layer and said rubber cement layer are each from about 1 to about 5 mils thick.

4. A laminate according to claim 2, wherein one said laminate having a fluoroplastic substrate and a second said laminate having a metal substrate are bonded along the surfaces of said rubber compound layers, the bond resulting form vulcanization of said rubber compound layers.

5. An adhesive laminate according to claim 4, wherein said metal substrate is steel and said laminate is used in a railroad tank car.

6. A laminate according to claim 4, wherein said ty ply layer contains from about 3 to about 15 phr of a filler selected from the group consisting of carbon black, silica and combinations thereof;

wherein said ty coat layer contains from about 2.5 to about 7.5 phr of antioxidant, from about 0.5 to about 1.5 phr zinc oxide, from about 0.2 to about 0.8 phr stearic acid, from about 1.0 to about 2.0 phr rosin oil, from about 0.1 to about 0.5 phr of an accelerator and from about 1.0 to about 3.0 phr of sulfur;

wherein said rubber cement layer contains from about 0.5 to about 1.5 phr antioxidant, from about 0.5 to about 1.5 phr zinc oxide, from about 0.2 to about 0.8 phr stearic acid, from about 1.0 to about 2.0 phr rosin acid, from about 0.1 to about 0.5 phr of an accelerator and from about 1.0 to about 3.0 phr of sulfur, and wherein said elastomer is natural or synthetic cis 1,4 polyisoprene.

* * * * *